(12) United States Patent
Anantharam et al.

(10) Patent No.: US 9,400,669 B2
(45) Date of Patent: Jul. 26, 2016

(54) VIRTUAL APPLIANCE CHAINING AND MANAGEMENT

(71) Applicant: INTERNATIONAL BUSINESS MACHINES CORPORATION, Armonk, NY (US)

(72) Inventors: Sushma Anantharam, Cupertino, CA (US); Keshav G. Kamble, Santa Clara, CA (US); Vijoy A. Pandey, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 242 days.

(21) Appl. No.: 13/743,025

(22) Filed: Jan. 16, 2013

(65) Prior Publication Data
US 2014/0201348 A1 Jul. 17, 2014

(51) Int. Cl.
*G06F 15/173* (2006.01)
*G06F 9/455* (2006.01)
*H04L 12/64* (2006.01)
*H04L 12/24* (2006.01)

(52) U.S. Cl.
CPC ........ *G06F 9/45558* (2013.01); *H04L 12/6418* (2013.01); *H04L 41/022* (2013.01)

(58) Field of Classification Search
CPC ................................................ G06F 9/45558
USPC ....................................................... 709/223
See application file for complete search history.

(56) References Cited

U.S. PATENT DOCUMENTS

| | | | |
|---|---|---|---|
| 7,805,516 B2 | 9/2010 | Kettler et al. | |
| 8,037,180 B2 * | 10/2011 | Smith et al. | 709/225 |
| 2007/0294676 A1 | 12/2007 | Mellor et al. | |
| 2009/0094673 A1 * | 4/2009 | Seguin | G06F 21/51 726/1 |
| 2009/0216999 A1 * | 8/2009 | Gebhart | G06F 9/5077 712/36 |
| 2009/0222560 A1 | 9/2009 | Gopisetty et al. | |
| 2009/0276771 A1 * | 11/2009 | Nickolov | G06F 9/4856 717/177 |
| 2009/0300641 A1 | 12/2009 | Friedman et al. | |
| 2011/0004676 A1 * | 1/2011 | Kawato | 709/221 |
| 2011/0246899 A1 * | 10/2011 | Kwon | H04L 41/5041 715/736 |
| 2012/0054736 A1 | 3/2012 | Arcese et al. | |
| 2014/0123135 A1 * | 5/2014 | Huang | H04L 41/5054 718/1 |

OTHER PUBLICATIONS

Unal et al., "Virtual Application Appliances in Practice: Basic Mechanism and Overheads", 2010 12th IEEE International Conference on High Performance Computing and Communications.
IP.com et al., "Method and System for Effective Provisioning of Virtual Appliances in a Highly Virtualized Data Center", Sep. 27, 2011.

* cited by examiner

*Primary Examiner* — Wing F Chan
*Assistant Examiner* — Andrew Woo
(74) *Attorney, Agent, or Firm* — Shimokaji IP

(57) ABSTRACT

Management of virtual resources may be provided by interconnecting a plurality of virtual appliances with common executable software services. A data packet may be sent through multiple virtual appliances invoking services within each if rules stored within respective virtual appliances correspond to a request for service in the data packet. The data packet may be passed through multiple virtual appliances prior to being returned to a hypervisor.

15 Claims, 6 Drawing Sheets

| RULE ID 210 | RULE 220 | ACTION 230 | NEXT APPLIANCE ID 240 | VM Ids 250 | VM Mac ADDRESSES 260 |
|---|---|---|---|---|---|
| 1 | {DMAC1, SMAC1, 0x800,12, 10, 10.2.1.10, 192.168.2.1, 0x06, 202,23} | SERVICE | APP2 | X | 00:00:4c:5d:1a:2b |
| 2 | {0,0, 0x800,12, 10, 10.2.1.12, 192.168.2.4, 0x06, 242,23} | BY-PASS | APP2 | Y | 00:00:23:45:ed:fc |

VIRTUAL APPLIANCE CHAINING AND MANAGEMENT

BACKGROUND

The present invention relates to network resource management, and more specifically, to virtual appliance chaining and management.

A virtual appliance is a mechanism by which software services may be deployed in a virtualized server environment. Each software service is typically bundled with an operating system to construct a software bundle called the virtual appliance. Typically, a single software service may be bundled into a virtual appliance for deployment.

In conventional deployment schemes, a hypervisor may manage multiple virtual machines. The hypervisor may send service related packets to each virtual machine. Typically, the hypervisor sends a single virtual appliance at a time to a virtual machine for execution of the service bundled in the appliance. Once the service related action is performed, a packet reply is returned to the hypervisor with modifications to the context of the service and the process of sending and reply continues for each service needed by the virtual machine.

In a server with multiple virtual machines, packet latency may build up as a result of the multiple packet exchanges and changes in service context within packets. In virtual machines requiring multiple services, management of the different services may require separate control from separate consoles. In addition, each virtual appliance may use its own set of resources. For example, a virtual appliance may incur separate log files, output and results files, configuration files, infrastructure libraries and, operating system abstraction calls. This may contribute increased resource needs within the environment. In addition, in heterogeneous virtual appliance, an administrator may need to debug various incompatible service instructions between appliances.

SUMMARY

According to one embodiment of the present invention, a computer program product for managing virtual appliances, comprises a computer readable storage medium having computer readable program code embodied therewith. The computer readable program code is configured to: interconnect a plurality of virtual appliances; provide a plurality of software services executable within each of the virtual appliances; provide for each virtual appliance, a rules module corresponding to the plurality of software services; and determine for a data packet passed through the plurality of virtual appliances whether a first virtual appliance receiving the data packet should execute the one or more software services according to the rules module or pass the data packet on to a second virtual appliance.

According to another embodiment of the present invention, a virtual machine comprises a plurality of interconnected virtual appliances. The virtual machine may include a plurality of software services configured executable within each of the virtual appliances. The virtual machine may also include a computer readable storage medium having computer readable program code embodied therewith, the computer readable program code being configured to: analyze a data packet received by a first of the virtual appliances, and make a determination as to whether one or more of the plurality of software services should be executed within the first virtual appliance or pass the received data packet to a next virtual appliance.

According to yet another embodiment of the present invention, a network server comprises a plurality of interconnected virtual appliances. Each virtual appliance may include a bundled set of software services executable within respective virtual appliances. The network server may also comprise a hypervisor configured to provide a data packet to the plurality of interconnected virtual appliances. The data packet may include a set of rules controlling whether respective virtual appliances execute one or more of the software services or whether respective virtual appliances bypass execution of the one or more software services to a next virtual appliance within the plurality of interconnected virtual appliances.

DETAILED DESCRIPTION

Figure 1:
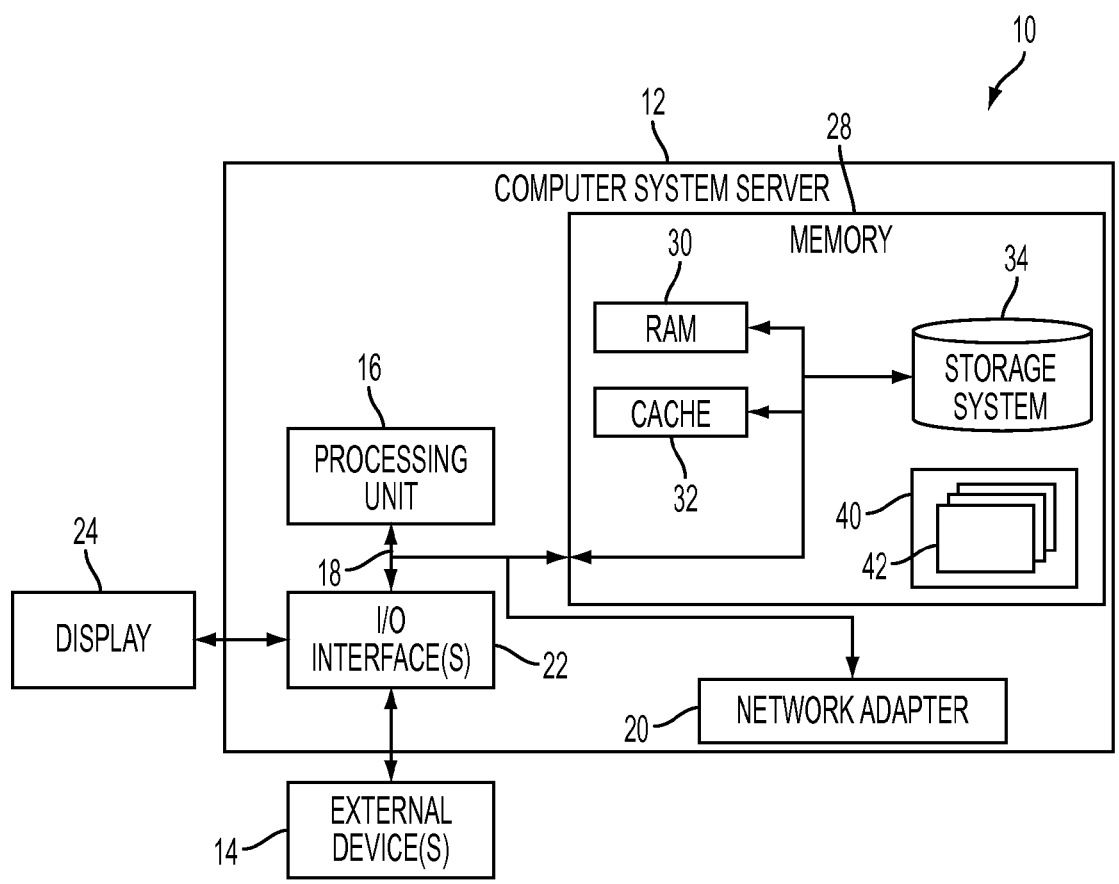
FIG. 1 depicts a cloud computing node according to an embodiment of the present invention.

As will be appreciated by one skilled in the art, aspects of the present invention may be embodied as a system, method or process, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable storage media having computer readable program code embodied thereon.

Any combination of one or more computer readable storage media may be utilized. A computer readable storage medium is an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium is any tangible medium that can store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics may include:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities may be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email).

The consumer need not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer need not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications.

The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node 10 is shown. The cloud computing node 10 illustrated is only one example of a suitable cloud computing node and is not intended to suggest any limitation as to the scope of use or functionality of embodiments of the invention described herein. Regardless, the cloud computing node 10 is capable of being implemented and/or performing any of the functionality set forth hereinabove.

In the cloud computing node 10 there is a computer system/server 12, which is operational with numerous other general purpose or special purpose computing system environments or configurations. Examples of well-known computing systems, environments, and/or configurations that may be suitable for use with the computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 12 may be described in the general context of computer system executable instructions, such as program modules, being executed by a computer system. Generally, program modules may include routines, programs, objects, components, logic, data structures, and so on that perform particular tasks or implement particular abstract data types. The computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, a computer system/server 12 in the cloud computing node 10 is shown in the form of a general-purpose computing device. The components of the computer system/server 12 may include, but are not limited to, one or more processors or processing units 16, a system memory 28, and a bus 18 that couples various system components including the system memory 28 to the processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 may typically include a variety of computer system readable media. Such media could be chosen from any available media that is accessible by computer system/server 12, including volatile and non-volatile media, removable and non-removable media.

The system memory 28 could include one or more computer system readable media in the form of volatile memory, such as a random access memory (RAM) 30 and/or a cache memory 32. The computer system/server 12 may further include other removable/non-removable, volatile/non-volatile computer system storage media. By way of example only, a storage system 34 can be provided for reading from and writing to a non-removable, non-volatile magnetic media device typically called a "hard drive" (not shown). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to the bus 18 by one or more data media interfaces. As will be further depicted and described below, the system memory 28 may include at least one program product having a set (e.g., at least one) of program modules that are configured to carry out the functions of embodiments of the invention.

A program/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. Alternatively, the computer system/server 12 can communicate with one or more networks such as a local area network (LAN), a general wide area network (WAN), and/or a public network (e.g., the Internet) via a network adapter 20. As depicted, the network adapter 20 may communicate with the other components of computer system/server 12 via the bus 18. It should be understood that although not shown, other hardware and/or software components could be used in conjunction with the computer system/server 12. Examples, include, but are not limited to: microcode, device drivers, redundant processing units, external disk drive arrays, RAID systems, tape drives, and data archival storage systems, etc.

Figure 2:
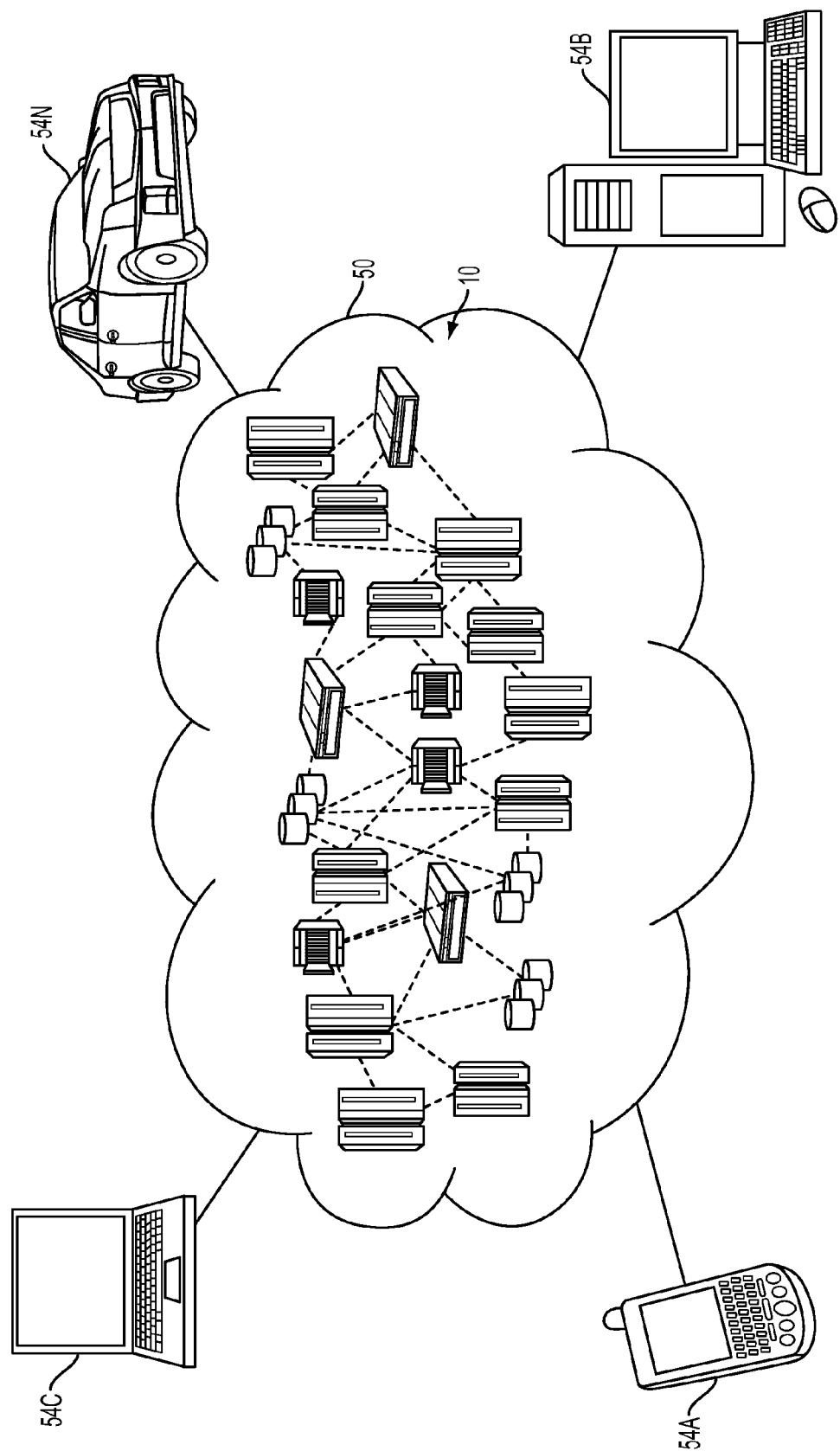
FIG. 2 depicts a cloud computing environment according to another embodiment of the present invention.

Referring now to FIG. 2, an illustrative cloud computing environment 50 is depicted. As shown, the cloud computing environment 50 comprises one or more cloud computing nodes 10 with which local computing devices used by cloud consumers, such as, for example, a personal digital assistant (PDA) or a cellular telephone 54A, desktop computer 54B, laptop computer 54C, and/or a automobile computer system 54N may communicate. The nodes 10 may communicate with one another. They may be grouped physically or virtually, in one or more networks, such as Private, Community, Public, or Hybrid clouds as described hereinabove, or a combination thereof. This allows cloud the computing environment 50 to offer infrastructure, platforms and/or software as services for which a cloud consumer does not need to maintain resources on a local computing device. It is understood that the types of computing devices 54A-N shown in FIG. 2 are intended to be illustrative only and that the computing nodes 10 and the cloud computing environment 50 can communicate with any type of computerized device over any type of network and/or network addressable connection (e.g., using a web browser).

Figure 3:
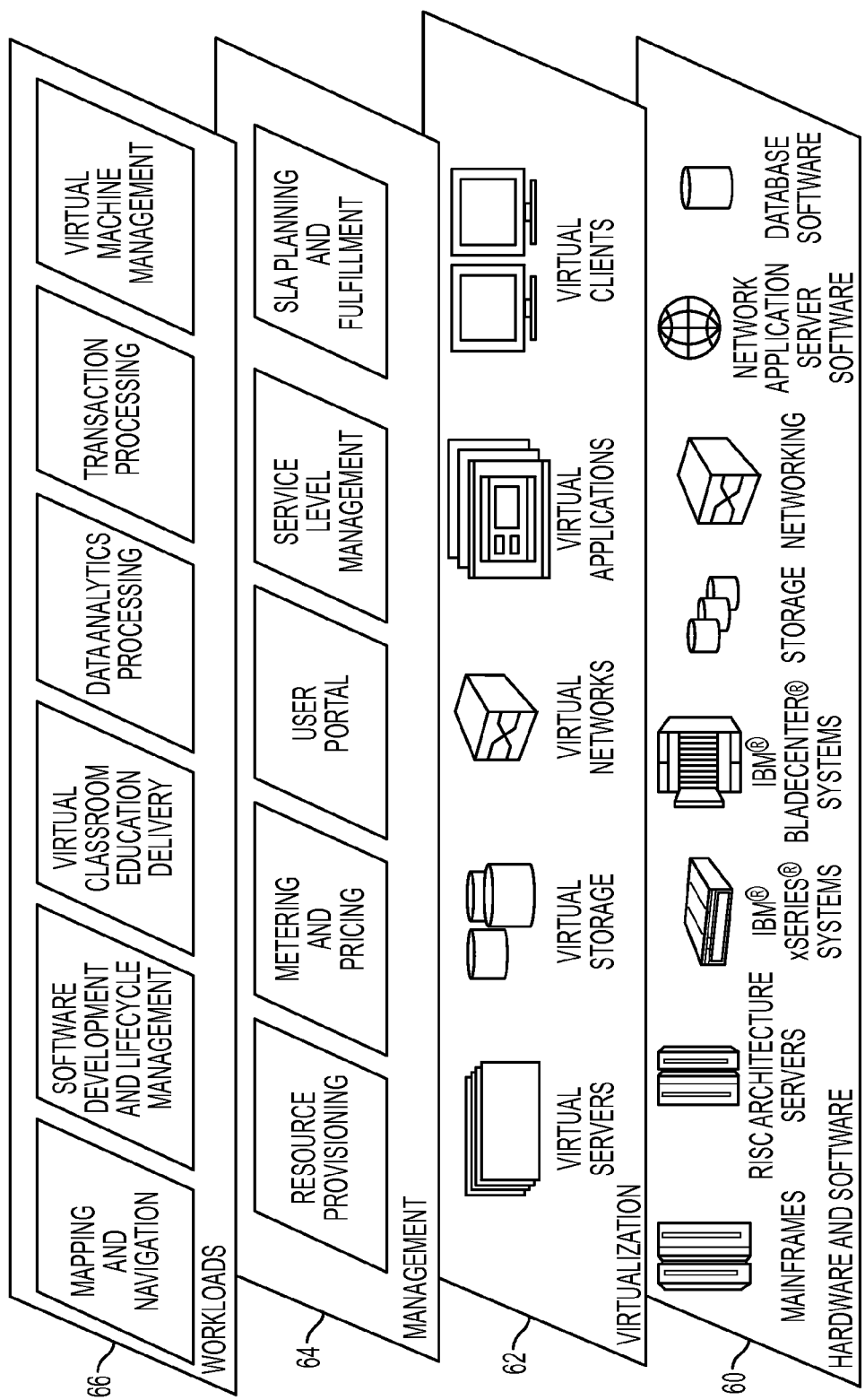
FIG. 3 depicts abstraction model layers according to yet another embodiment of the present invention.

Referring now to FIG. 3, a set of functional abstraction layers provided by the cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

A hardware and software layer 60 may include hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

A virtualization layer 62 provides an abstraction layer from which the following examples of virtual entities may be provided: virtual servers; virtual storage; virtual networks, including virtual private networks; virtual applications and operating systems; and virtual clients.

In one example, a management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

A workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and managing virtual machines.

Figure 4:
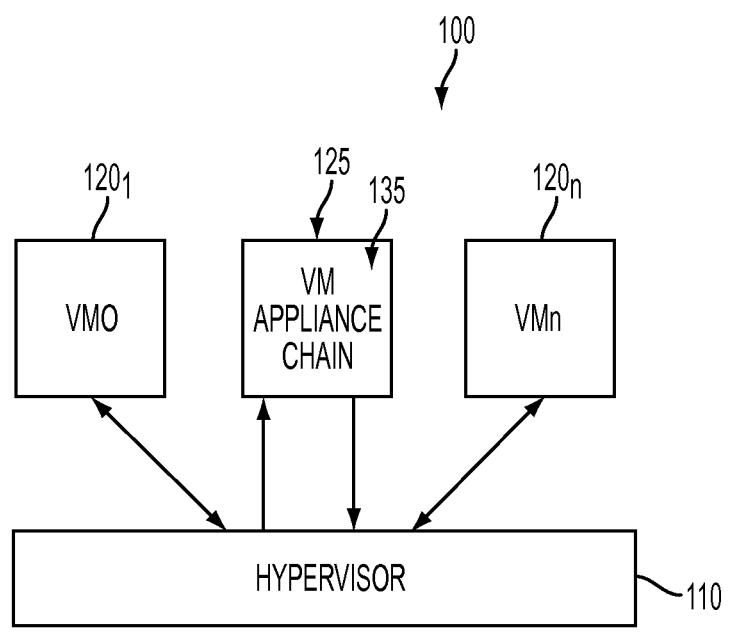
FIG. 4 is a block diagram of a virtual server according to still another embodiment of the present invention.

Referring now to FIG. 4, a network server 100 is shown according to an exemplary embodiment of the present invention. The server 100 may include any of the elements described in the aforementioned server 12 but for sake of illustration, these elements are not repeated. The server 100 may include a hypervisor 110 and one or more virtual machines $120_1$-$120_n$ and 125. The virtual machine 125 may include a set of interconnected virtual appliances 135. It will be understood that in some embodiments, the virtual machines $120_1$-$120_n$ may include the set of interconnected virtual appliances 135 however for sake of illustration embodiments of the invention will be described in the context of the virtual machine 125. The hypervisor 110 may be configured to provide data packets (represented by arrows) to the set of interconnected virtual appliances 135. Details of packet flow, packet handling, and the set of interconnected virtual appliances 135 are described in further detail below.

Figures 5, 6:
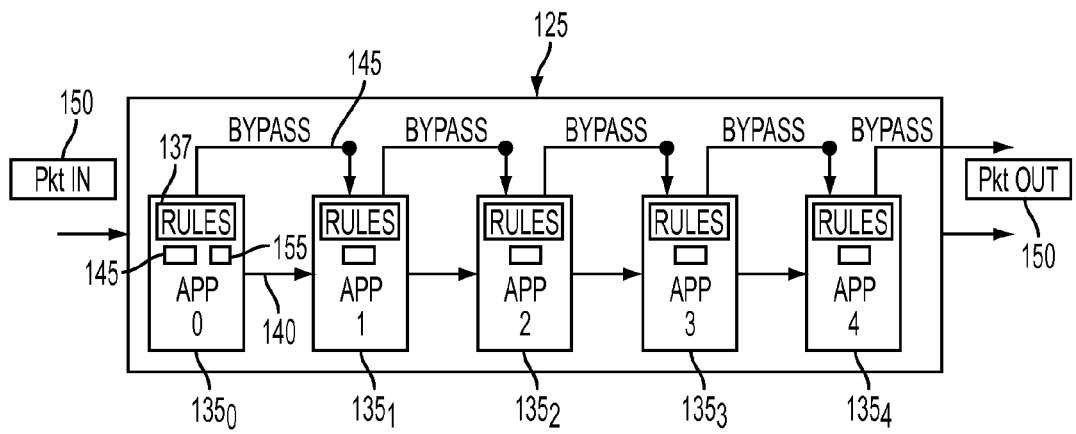
FIG. 5 is a block diagram of a virtual machine employing chaining of virtual appliances according to still yet another embodiment of the present invention.
FIG. 6 is a rules table employed in the virtual machine of FIG. 5 according to still yet another embodiment of the present invention.

Referring now to FIG. 5, the virtual machine 125 is shown in greater detail according to an exemplary embodiment of the present invention. In general, the virtual machine 125 may include a plurality of virtual machines ($135_0$-virtual appliance $135_4$), a rules module 137, a set of software services 145, and an operating system abstraction library. While shown individually as virtual appliance $135_0$-virtual appliance $135_4$, the appliances may be referred to collectively and in general as virtual appliance(s) 135. In embodiments of the invention, the virtual appliances 135 may be chained together in a series for sequential processing of a data packet 150. For example, a data packet 150 may be sent to the virtual machine 125, received by the virtual appliance $135_0$, processed and then passed to virtual appliance $135_1$ and so on through each virtual appliance 135 in the virtual machine 125 until the data packet 150 is passed out of the virtual appliance $135_4$ and out of the virtual machine 125. Thus, the data packet 150 may not be returned to the hypervisor 110 (FIG. 4) until the data packet 150 passes through multiple virtual appliances 135.

In an exemplary embodiment, the data packet 150 may be constructed to include one or more rules. The rules may provide instructions interpreted by each of the virtual appliances 135. The rules may indicate, for each virtual appliance 135 receiving the data packet 150, whether one or more actions should be executed. The determination of whether a rule in the data packet 150 applies to a given virtual appliance 135 may depend on rules present in the rules module 137. In some cases, where the rules module 137 determines that the data packet 150 includes an executable request, the data packet 150 may be processed and passed to the next virtual appliance 135 (the action represented by arrow 140). In some cases where the rules module determines that the data packet 150 does not include an executable request, the data packet 150 may be bypassed to the next virtual appliance 135 (the action represented by arrow 145).

The virtual appliance 135 may include a set of bundled software services 145. The software services 145 may be executable for use on the virtual appliance 135. The set of software services 145 may be common among the virtual appliances 135. The determination of whether a particular software service within the set of software services 145 is executed may be determined by instructions present in the data packet 150 and according to the rules module 137. In some embodiments, not every software service 145 may be needed within each virtual appliance 135. As described above, if a data packet 150 requests execution of a software service that does not apply to one of the virtual appliances 135, then that appliance may pass the data packet 150 on to the next virtual appliance 135. However, employing a common set of software services 145 may provide greater flexibility and ease in setup configuration of each virtual appliance 135. A common operating system abstraction library 155 may also be included within each virtual appliance 135. Thus, set up each virtual appliance 135 may be facilitated and compatibility issues between virtual appliances 135 may be avoided.

The virtual appliances 135 may be configured so that the frame buffer on which the appliances operate has the same format and all the virtual appliances 135 may comply with the format for processing. Moreover, the frame buffers where data packets 150 may be stored for processing may be stored in zero copy buffers. The buffers need not be copied from one place to another just to change a process context. The buffers may be stored in a global buffer memory in kernel context. The memory may be mapped in user space for all the virtual appliances 135 to work. Thus the frame (data packet 150) processing may be faster without the overhead associated with copying frames between virtual appliances 135.

With reference to FIGS. 5 and 6, the virtual machine 125 is described with respect to the rules module 137 in further detail. The rules module 137 may include a table 200 of rules. The rules may be a set of flows and associated actions. Flows may be a set of tuples from the network data packet 150 header. Flows may be identified by one or more of: a destination MAC address; a source MAC address; an Ether type; an s-tag; a c-tag; a source IP address; a destination IP address; a protocol type; a source port; a destination port; an IP options, etc. If a flow matches an action to by-pass processing and points to next virtual appliance 135, the processing virtual appliance 135 may queue a frame pointer in the queue for the next virtual appliance 135.

The table 200 may include reference categories for invoking actions related to the rules present in the data packet 150, identifying: a rule identification number 210, a rule 220, an action 230, a next virtual appliance identification 240, a virtual machine identification 250, and a virtual machine MAC address 260. The virtual appliances 135 may have a different table 200 with distinct rules for each appliance. The rule identification number 210 may associate each rule that may be attached to the data packet 150 with an identification number. For sake of illustration, only two rules are shown, however it will be understood that more than two rules may be included within a table 200.

The rule category 220 may list the various rules that may be attached to the data packet 150. The action category 230 may list an action to be taken associated with a rule included in the data packet 150 when received by the virtual machine 135. For example, the rule designated as rule ID "1" may be serviced within this virtual appliance 135, thus indicating execution of, for example, the software service 145 associated with the rule. For example, the rule designated as rule ID "2" may include an action indicating that execution of the rule should be by-passed to the next virtual appliance 135.

After the determination to service or by-pass the rule, the table 200 may indicate which virtual appliance 135 should receive the data packet 150 next according to the next virtual appliance identification 240 category. In some embodiments, for example chained virtual appliances 135, the next virtual appliance identification 240 category may be the same throughout the table 200. In some embodiments, the next virtual appliance identification 240 category may be different among rules depending on whether the rule was serviced or by-passed.

Appliance chaining may be handled according to the rules table 200 in each virtual appliance 135. On insertion of a new virtual appliance 135 in the chain, it may only be necessary to change the rule table in the preceding virtual appliance 135. The new virtual appliance 135 being added should have a rules table 200 instructing the data packet's 150 next virtual appliance 135 stop in the chain.

In some embodiments of the invention, compute type virtual machines 125 may move from one physical server (not shown) to another. In some embodiments, each rule may be associated to one or more virtual machines 125. This may be achieved by associating the virtual machine identification 250 and virtual machine MAC address 260 with each rule. This may enable easy moving of rules and the virtual appliance 135 instance from one physical server to the other as the compute virtual machine 125 moves. For example, when a compute virtual machine 125 moves, a new instance of the virtual appliance 135 which may hold rules for the compute virtual machine 125, may be created and may move from one server to the other along with the compute virtual machine 125. The new virtual appliance 135 chain may carry with it the functionality which may be important for the compute virtual machine 125 being moved. Thus, a new virtual appliance 135 chain may be a subset of the original virtual appliance 135 chain and the set of rules for the new virtual machine may be a subset of rules from the compute virtual machine 125.

If more virtual machines 125 move to the same physical server as the previous compute virtual machine 125, the move may not create a completely new appliance virtual machine. Instead it may use the previously created appliance machine and add all the new appliance services in the chain along with the rules associated with the moving compute virtual machine 125. Thus managing appliance services may be made easier and services may be provided non-stop.

Figure 7:
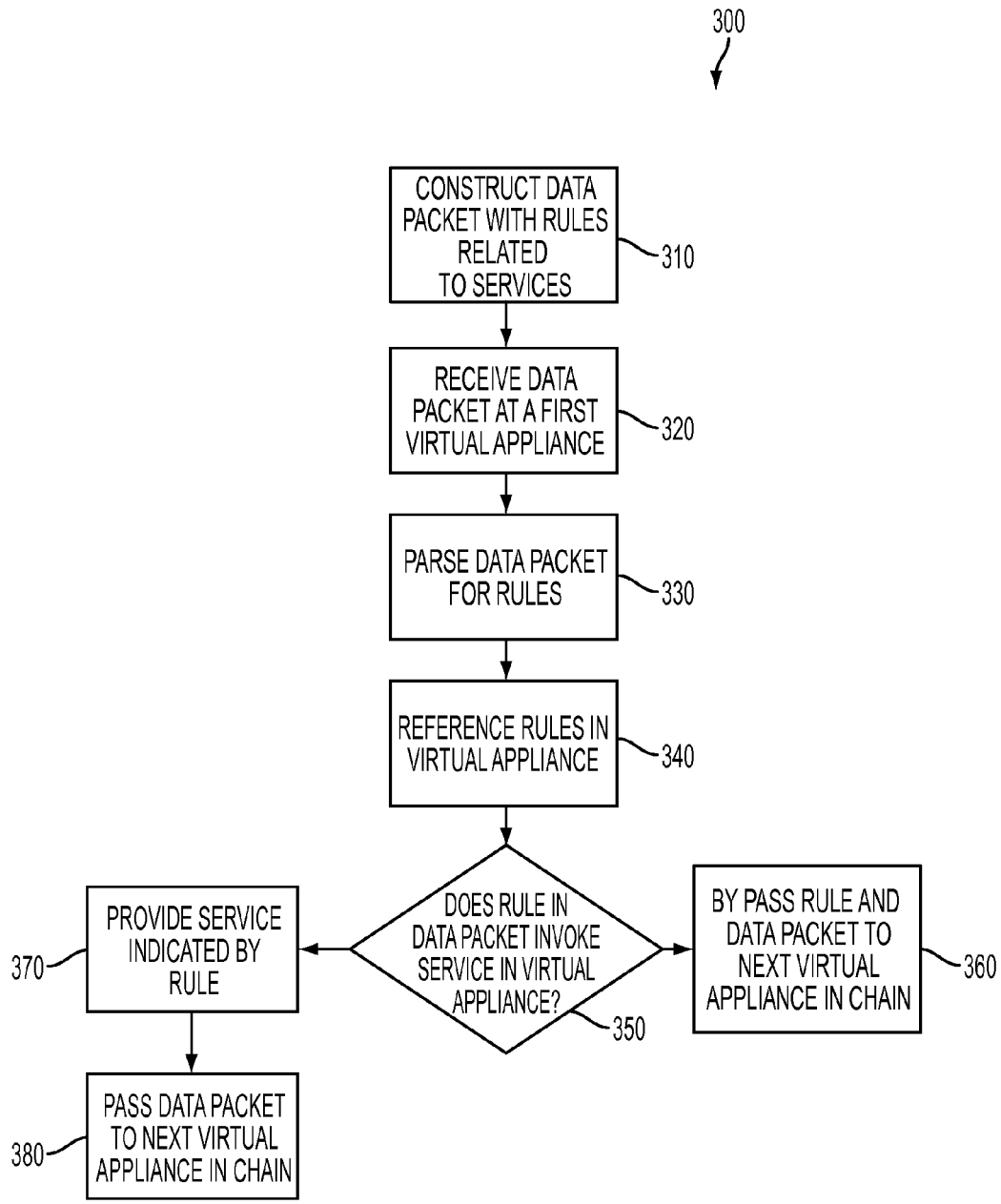
FIG. 7 is a flowchart of a method of processing services within the virtual machine of FIG. 5 according to still yet another embodiment of the present invention.

Referring now to FIG. 7, a process 300 of managing virtual appliances is shown according to an exemplary embodiment of the present invention. A virtual appliance manager may construct (310) a data packet with rules related to services for execution within one or more interconnected virtual appliances. A first virtual appliance within the interconnected virtual appliances may receive (320) the data packet. The virtual appliance may parse (330) the data packet for rules. The virtual appliance may reference (340) a rules module. The virtual appliance may determine (350) whether the data packet includes rules invoking services in the virtual appliance. If not, the virtual appliance may by-pass (360) the rule(s) in the data packet and pass the packet on to a next virtual appliance among the interconnected virtual appliances. If the data packet does include rules invoking services in the virtual appliance, the virtual appliance may provide (370) the service request. The virtual appliance may pass (380) the data packet on to the next virtual appliance.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for managing virtual appliances, the computer program product comprising a computer readable storage medium having computer readable program code embodied therewith, the computer readable program code being configured to:
    interconnect a plurality of virtual appliances in a communication chain formed according to a rules table in each of the plurality of virtual appliances;
    provide, via a hypervisor, a plurality of software services executable within each of the virtual appliances;
    provide, for each virtual appliance, a first rules module corresponding to the plurality of software services, wherein the first rules module in a first virtual appliance is different than a second rules module in a second virtual appliance;
    determine for a data packet passed through the communication chain of virtual appliances whether a first virtual appliance receiving the data packet should execute one or more software services according to the first rules module of the first virtual appliance or pass the data packet on to the second virtual appliance, wherein the data packet is returned to the hypervisor in response to execution of the plurality of software service, wherein the first virtual appliance and the second virtual appliance are among the communication chain of virtual appliances;
    move a selected one of the virtual appliances by creating a new instance of the second virtual appliance, and change the rules table in the first virtual appliance in a new communication chain of virtual appliances; and
    wherein the move of the selected one of the virtual appliances moves the selected one of the virtual appliances from a first physical server to a second physical server.

2. The computer program product of claim 1, wherein each of the plurality of virtual appliances includes a common operating system abstraction library.

3. The computer program product of claim 1, wherein the first rules module corresponding to the plurality of software services includes identification of a next virtual appliance for receipt of the data packet.

4. The computer program product of claim 1, wherein the first rules module corresponding to the plurality of software services includes an action to by-pass a current one of the plurality of virtual appliances in receipt of the data packet.

5. The computer program product of claim 1, wherein the plurality of virtual appliances are configured as a virtual machine.

6. The computer program product of claim 5, wherein the data packet is received by or by-passes each of the virtual appliances in the virtual machine.

7. A virtual machine, comprising:
    a plurality of interconnected virtual appliances in a communication chain formed according to a rules table in each of the plurality of virtual appliances;
    plurality of software services configured to be executable within each of the virtual appliances;
    and a computer readable storage medium having computer readable program code embodied therewith, the computer readable program code being configured to:
    analyze a data packet received by a first of the virtual appliances from a hypervisor, wherein the data packet comprises rules indicating whether one of more actions should be executed and is analyzed by the first virtual appliance;
    make a determination as to whether one or more of the plurality of software services should be executed within the first virtual appliance or whether the received data packet should be passed to a next virtual appliance, based on the analysis of the data packet by the first virtual appliance, and based on rules in a rules module in each in each of the plurality of virtual appliances prior to sending the data packet back to the hypervisor; and
    create a new instance of the virtual appliances by using the second virtual appliance and using rules in the rules module that are not included in the second virtual appliance by a change to the rules table in the first virtual appliance in a new communication chain of virtual appliances as a subset of the communication chain.

8. The virtual machine of claim 7, wherein each of the plurality of virtual appliances includes a common operating system abstraction library.

9. The virtual machine of claim 7, wherein the computer readable program code is configured to reference the rules module in each of the plurality of virtual appliances to make the determination.

10. The virtual machine of claim 9, wherein the rules module includes an action to by-pass a current one of the plurality of virtual appliances in receipt of the data packet.

11. A network server, comprising:
    a hardware computer processor;
    a system memory;
    computer readable hardware storage medium in the system memory having computer readable program code embodied thereon, the computer readable program code being configured to execute on the hardware computer processor, and the computer readable program code configured to provide:

a virtual machine including a plurality of interconnected virtual appliances in a communication chain formed according to a rules table in each of the plurality of virtual appliances, wherein each virtual appliance includes a bundled set of executable software services executable within the plurality of virtual appliances; and a hypervisor configured to provide a data packet to a first one of the plurality of interconnected virtual appliances, wherein the network server moves a selected one of the interconnected virtual appliances by creating a new instance of the selected one of the interconnected virtual appliances, and changes the rules table in a preceding virtual appliance in a new communication chain of virtual appliances as a subset of the communication chain, wherein the data packet includes a set of rules controlling whether respective virtual appliances execute one or more of the software services executable within the plurality of virtual appliances or whether respective virtual appliances bypass execution of the one or more software services to a next virtual appliance within the plurality of interconnected virtual appliances, wherein the new instance of the selected one of the interconnected virtual appliances is created by using a previously created instance of one of the interconnected virtual appliances including a previous set of rules for executing the executable software services, and adding new rules to the previous set of rules for the previously created instance of one of the interconnected virtual appliances, wherein the data packet is passed from a first one of the plurality of interconnected virtual appliances to a second one of the plurality of interconnected virtual appliances in response to performance of at least one of the bundled set of software services, wherein a data packet reply is returned to the hypervisor with modifications to a context of the at least one software service, and wherein a process of sending the data packet and an associated data packet reply continues for each software service needed by the respective virtual appliances.

12. The network server of claim 11, wherein each of the plurality of virtual appliances includes a common operating system abstraction library.

13. The network server of claim 11, wherein the plurality of virtual appliances are configured as a virtual machine.

14. The network server of claim 11, including a rules module within each of the plurality of virtual appliances, wherein the rules module is configured to determine an action corresponding to the set of rules matching the data packet.

15. The network server of claim 14, wherein the rules module is configured to determine whether the data packet should bypass one of the plurality of virtual appliances if the set of rules does not include an executable software service among the one or more software services for said virtual appliance.

* * * * *